United States Patent [19]

Cointot

[11] 4,319,360
[45] Mar. 9, 1982

[54] PREDICTOR STAGE FOR A DIGIT RATE REDUCTION SYSTEM

[75] Inventor: Denis F. Cointot, Paris, France

[73] Assignee: Societe Anonyme de Telecommunications, Paris, France

[21] Appl. No.: 131,235

[22] Filed: Mar. 17, 1980

[30] Foreign Application Priority Data

Nov. 30, 1979 [FR] France ................................ 79 29471

[51] Int. Cl.³ .......................................... H03K 13/22
[52] U.S. Cl. .............................. 375/27; 179/15.55 R; 332/11 D
[58] Field of Search ....................... 375/27, 28, 30, 31, 375/34; 332/11 D; 340/347 AD; 179/15.55 R

[56] References Cited

U.S. PATENT DOCUMENTS

| 3,502,986 | 3/1970 | Lucky | 375/27 |
| 4,107,669 | 8/1978 | Tewksbury | 375/27 |
| 4,179,710 | 12/1979 | Ishiguro et al. | 179/15.55 R |

*Primary Examiner*—Benedict V. Safourek
*Attorney, Agent, or Firm*—Jacobs & Jacobs

[57] ABSTRACT

A predictor stage for a digital processing system for sampled and PCM coded signals in the form of a sequence of samples $x_n$, having first transmission means and first reception means for forming a predicted sample $x_{pn}$. Second transmission means are also provided for subtracting said sample $x_{pn}$ predicted from said sample $x_n$ coming in at the transmission side, and deriving therefrom a difference sample $d_n$ representing the prediction error. The first transmission means has a recursive structure, with each predicted sample $x_{pn}$ being derived from the samples $d_n$, $d_{n-1}$, $d_{n-2}$ ... etc. previously obtained at the output of the second transmission means. The first reception means has a transverse structure, with each sample $x_{pn}$ being derived at the reception side from the difference samples $d_n$, $d_{n-1}$ ... , previously received. The samples $x_{pn}$ predicted at the reception side are added to the difference samples within the second reception means.

6 Claims, 10 Drawing Figures

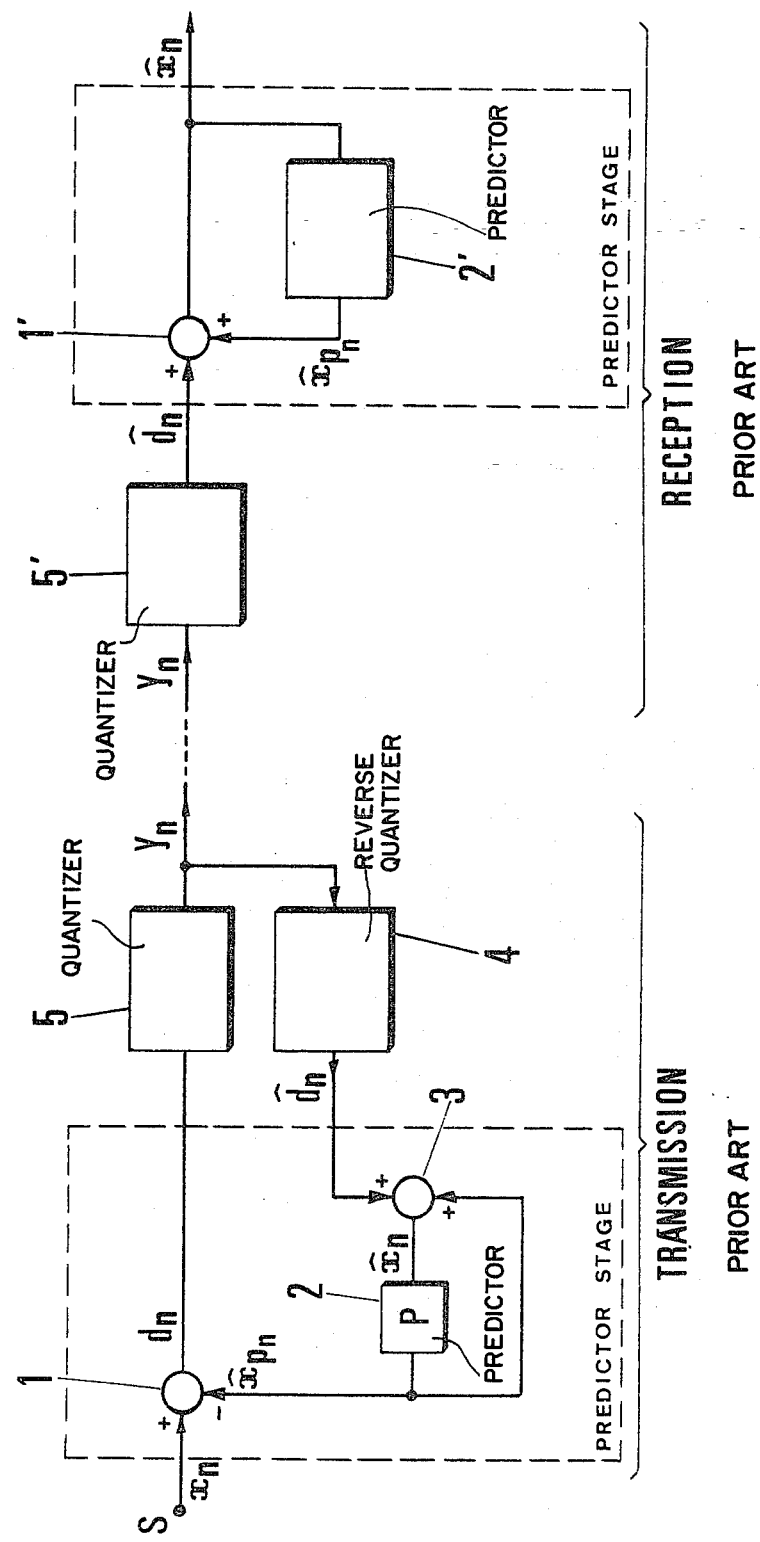

PREDICTOR STAGE FOR A DIGIT RATE REDUCTION SYSTEM

The present invention relates to the digital transmission of PCM coded information and more particularly to the digital processing for reducing the digit rate on the transmission line.

Signals capable of being processed by the system may be telephone signals such as speech, data, sound, telegraphy, multifrequency signals, etc . . . , image signals and, generally, all digital coded information presenting a redundancy.

Systems for reducing digit rates are already known. They achieve a compression of the digit rate by exploiting, for the transmission of a signal sample the knowledge acquired upon the transmission of the preceding samples. They usually consist in a cascaded arrangement of three stages; the first stage, called predictor stage, makes it possible to replace the input PCM signal by a signal $d_n$ representing the difference between the input PCM signal and the predicted value of this sample calculated from the preceding samples. In a second stage, called automatic gain compression stage, the amplitude of the difference signal $d_n$ derived from the first stage is divided by an estimator of the mean power. A third stage, called quantizer, effects coding of the samples derived from the second stage and furnishes, at the output, a digital signal of reduced redundancy formed by words of fixed length or of variable length. An equivalent device at reception enables the PCM signal to be recovered.

It is an object of the invention to provide a digital processing device which is stable even in the presence of transmission errors.

The invention consists in providing a digital processing system comprising a predictor stage with recursive structure at transmission and a predictor stage with transverse structure at reception. The reception predictor in this case having a finite memory, the trailing of the error is limited and does not affect the convergence of the system.

The invention is applied to all systems with linear prediction, for example with matchable prediction or fixed prediction.

The invention will be more readily understood on reading the following description with reference to the accompanying drawings, in which:

FIG. 1 is a schematic representation of the digit rate reducing devices of the prior art.

FIGS. 2a and 2b schematically show the structure of the stages, the influence of the quantizer.

FIG. 6 is a detailed diagram of a predictor stage of the transmission part, variant embodiment of FIG. 3a.

Figure 2A:
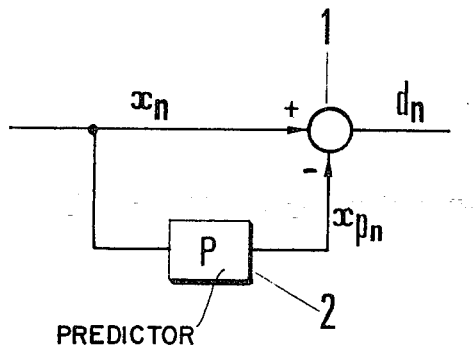

With reference to FIG. 1, the predictor stage of the transmission part of the known digit rate reduction devices is usually composed of an adder-subtractor circuit 1 which receives the samples $x_n$ of the input PCM signal S and furnishes at the output a signal $d_n$ representing the difference between the value of the incoming sample $x_n$ and the predicted sample $x_{pn}$. This predicted sample $x_{pn}$ is furnished by a predictor 2 from a sample $x_n$ furnished by an addition circuit 3. The predictor 2 is usually a fixed predictor, or an adaptative predictor as in the case of Applicant's earlier French Patent Application No. 79 20 445.

The addition circuit 3 receives the sample $x_{pn}$ predicted by the predictor 2 and adds it to the estimated sample $d_n$ furnished by a reverse quantizer 4. The difference sample $d_n$ furnished by the addition circuit 1 is applied to the input of a quantizer 5 which furnishes, at the output, samples $y_n$ with reduced rate.

At reception, the signal $y_n$ is received by the quantizer 5' which furnishes a difference signal $d_n$ at the input of a predictor stage. This predictor stage is essentially composed of an addition circuit which adds the difference signal $d_n$ derived from the reverse quantizer 5', to the sample $x_{pn}$ furnished by the predictor 2.

A recovered signal $x_n$ is available at the output of the addition circuit 1'. This signal $x_n$ is, on the one hand, applied to the input of the predictor 2', on the other hand is available at the output of the rate reducing device.

FIG. 2a schematically shows the predictor stage of the prior art thus described when the noise ascribable to the quantizer is disregarded. The predictor stage is usually in the form of a transverse filter at transmission making a prediction from the incoming signal $x_n$ and furnishing samples $x_{pn}$ predicted from the preceding samples; to this end, a predictor 11 furnishes coefficients $a_i$, fixed or optimized according to the systems, such that $$d_n = x_n - \sum_{i=1}^{N} a_i x_{n-i},$$

where N is the number of coefficients of the predictor.

When the coefficients are reactualized by means of any algorithm, for example the gradient algorithm or the Kalman algorithm, the rate reducing device is better adapted to the different statistics of the signals, but is unstable at reception in the presence of transmission errors.

Figure 2B:
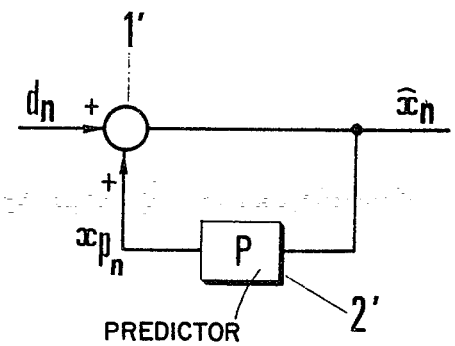

In fact, the reception predictor stage of the known systems as shown in FIG. 2b recalculates the signal $x_n$ from the erroneous signal, for example $d_n$, received. The reactualized coefficients used by the predictor 2' are then erroneous and the new sample $x_{n+1}$ is also erroneous. The error is propagated in the system, the algorithm reactualizing the coefficients at reception diverges from that of the transmission device (FIG. 2a), and may cause instabilities. Such a phenomenon is explained mathematically by observing that the structure of the predictor stage (FIG. 2b) is recursive at reception and that the transfer function of the reception device presents poles.

Such a design of the predictor stages at transmission and at reception requires heavy protection in the case of using the system on a noise channel.

Figure 3A:
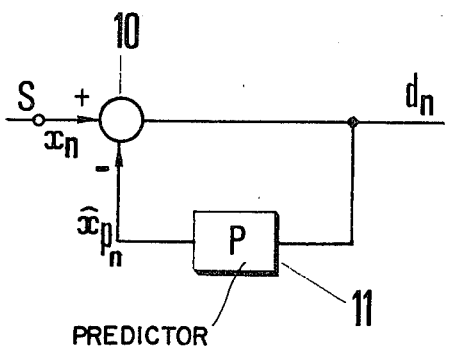
FIGS. 3a and 3b are schematic representations of the digital processing device according to the invention, disregarding the influence of the quantizer.
Figure 3B:
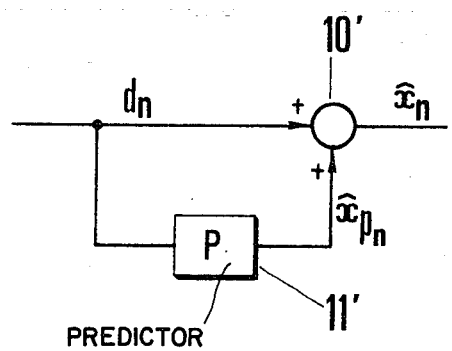

The transmission and reception predictor stages according to the invention are shown schematically in FIGS. 3a and 3b respectively. With reference to FIG. 3a, the incoming signal S is a signal sampled and coded in digital code. From each incoming sample $x_n$ is subtracted a predicted sample $x_{pn}$ furnished by a predictor 11 by means of a subtracter circuit 10 which furnishes difference samples $d_n$ at the output representative of the difference between the value of the incoming sample $x_n$ and of the predicted sample $x_{pn}$ furnished by the predictor 11. The predictor 11 receives, according to the invention, at its input, the difference signal $d_n$ transmitted in line and furnishes the signal $x_{pn}$ to the subtraction circuit 10. The difference signals $d_n$ are thus formed from the preceding sample $d_{n-1}$ according to the recurrent form of the type:

$$d_n = x_n - \sum_{i=1}^{N} a_i d_{n-i}$$

where $a_i$ are the N coefficients furnished by the predictor 11.

The predictor 11 may be of the type with fixed coefficients $(a_i)$ or of the type with optimized coefficients $(a_j)_{i=1,N}$. In this latter case, the coefficients are reactualized, for example at each sampling period according to the gradient algorithm, according to the Kalman algorithm or by any algorithm well known in the art.

Such a predictor stage presents a recursive structure at transmission. The transfer function of the transmission device is of the type:

$$G_e(Z) = \frac{1}{1 + \sum_{i=1}^{N} a_i Z^{-i}}$$

where the $(a_j)_{i=1,N}$ are the coefficients of the predictor 11.

FIG. 3b shows the predictor stage of the reception device. It consists essentially in a predictor 11', identical to that of the transmission device, furnishing from the difference signal $d_n$ received a predicted signal $x_{pn}$, which is added to the signal $d_n$ by means of an adder circuit 10', to form the reconstructed signal $\hat{x}_n$. Such a predictor stage is, at reception, of transverse structure. It makes at reception the prediction from the difference signal $d_n$. However, the transfer function is of the type $$G_r(Z) = 1 + \sum_{i=1}^{N} a_i z^{-i}$$

at reception and does not present any pole. Therefore, whatever the values of the coefficient $a_i$ of the predictor 11' at reception, this digit rate reducing device according to the invention will be stable as it will have at reception a predictor stage of transverse structure. Therefore, even in the presence of transmission errors, the device of the invention will be stable.

Figure 4:
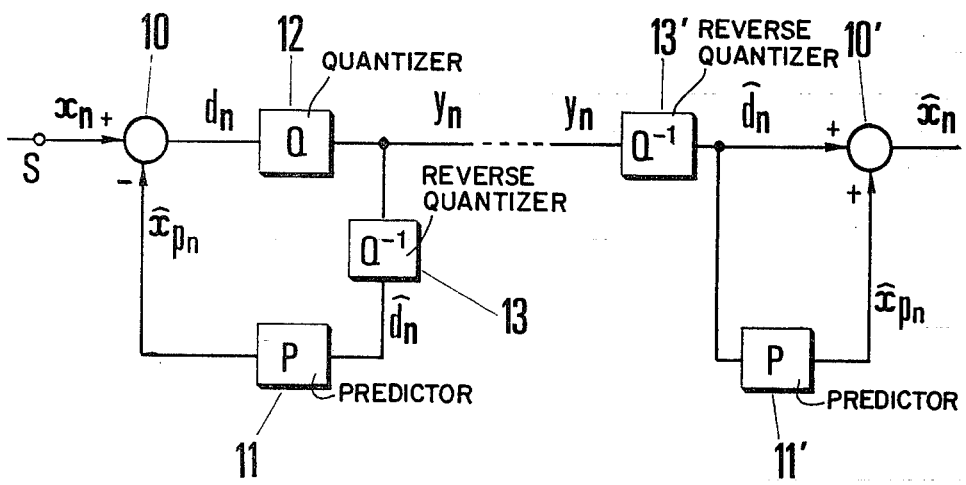
FIG. 4 is a detailed representation of the transmission predictor stage of FIG. 3, including the quantizer in the negative feedback loop.

FIG. 4 is a more complete representation of the transmission and reception devices for the digital processing of the coded signals according to the invention. The PCM incoming signals S received by the addition circuit 10 is converted into a difference signal $d_n$ by subtraction of the signal $x_{pn}$ predicted by the predictor 11. The difference signal $d_n$ from the addition circuit $d_n$ is converted into a reduced rate signal $y_n$ by means of a quantizer 12 well known in the art. Such a quantizer has already been described in Applicant's French Patent Application No. 79 20445. It essentially converts the high rate samples $d_n$ into a series of low rate samples $y_n$ as a function of the conditional probability distribution of the signal $d_n$ to be quantized.

The choice of the quantizing curve adopted, according to whether the signal to be processed is a data signal or a speech signal, may, in the same way as in the abovementioned Application, be determined by the knowledge of the vector of the coefficients $(a_j)_{i \leq j \leq N}$ of the predictor 11.

A reverse quantizer 13 mounted on a negative feedback loop receives at its input the signal $y_n$ transmitted in line and furnishes a signal $d_n$ identical to the one which would be received at reception in the absence of transmission errors. This magnitude $d_n$ is applied to the input of the predictor 11.

At reception, the low rate signal $y_n$ is received by the reverse quantizer 13' which furnishes at the output a difference signal $d_n$. This difference signal $d_n$ is applied on the one hand to the input of the predictor 11', and on the other hand to the input of the adder circuit 10'.

This adder circuit 10' adds the signal $d_n$ from the inverse quantizer 13' to the predicted signal $x_{pn}$ furnished by the predictor 11', and furnishes at the output a reconstructed signal $x_n$ whose rate is equal to that of the input signal S.

The predictor 11 and 11' of the transmission and reception devices may for example be able adaptative predictors applying the gradient algorithm. There is then a recurrent equation connecting the N coefficients A(n), enabling them to be reactualized $$A(n+1) = A(n) + K(n)$$

where $A(n) = [a_1(n) \text{ - - - } a_N(n)]$ is the vector of the coefficients, and where K(n) represents the correction vector at instant n, K(n) may be calculated by any algorithm used in prediction techniques, for example the gradient algorithm, Kalman algorithm or the like.

However, in order to avoid any instability at transmission and to ensure convergence of the transmission and reception devices, in particular of the transmission and reception predictor stages, a leakage term $(1-\beta)$ is added to the coefficient reactualization algorithm, $\beta$ being a constant of the order of $10^{-3}$. The equation of reactualization of the coefficients reads then:

$$A(n+1) = (1-\beta)[A(n) + K(n)]$$

Figure 5:
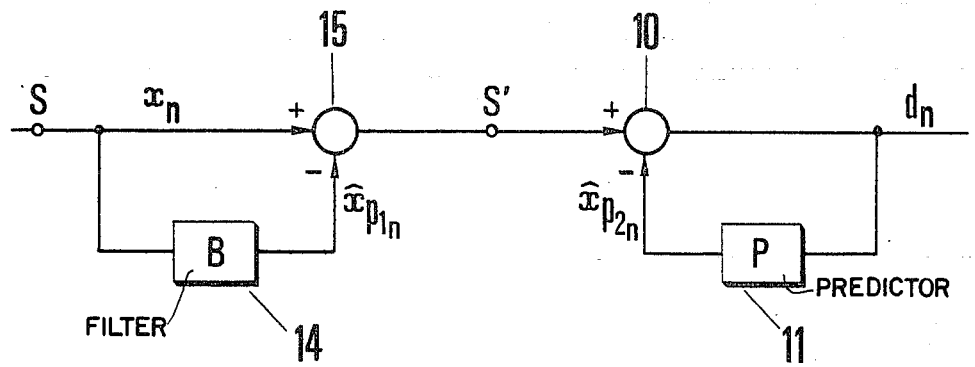
FIG. 5 is a variant embodiment of the transmission part of FIG. 3.

FIG. 5 shows a modified embodiment of the invention, in which the prediction for the speech signals is improved. A filter 14 is disposed at the input of the transmission predictor stage which makes a prefiltering promoting the prediction of the system according to the invention.

This filter 14 receives the incoming signal S composed of the samples $x_n$ and introduces a delay T amounting to a sampling period, said delay being equivalent to that of a conventional fixed predictor of the first order optimized for speech. The signal $x_{pn}$ furnished by the filter 14 is subtracted from the signal $x_n$ by means of the subtraction circuit 15. The signal S' furnished at the output of this subtraction circuit 15 is a signal having the same rate as S, but presenting a minimisation in energy for the low speech frequencies.

This signal S' is then processed in the same way as in the devices of the invention described with reference to FIGS. 3a and 4. In fact, a predictor 11 of a type known per se, for example an adaptative predictor functioning according to the gradient algorithm as described in Applicant's French Patent Application Ser. No. 79 20445, furnishes a prediction from the difference signals $d_n$ furnished by the preceding samples at the output of the addition circuit 10.

The predictor 11 furnishes at its output a predicted signal $x_{p2n}$ which is added to the sample $x'_n$ contained in the signal S'.

The difference samples $d_n$ furnished at the output of the transmission predictor stage of FIG. 5 enable properties of the data signals to be substantially unaltered and, for speech signals, and a gain to be obtained comparable to that obtained at the output of an adaptative predictor with the same number of coefficients.

Figure 6:
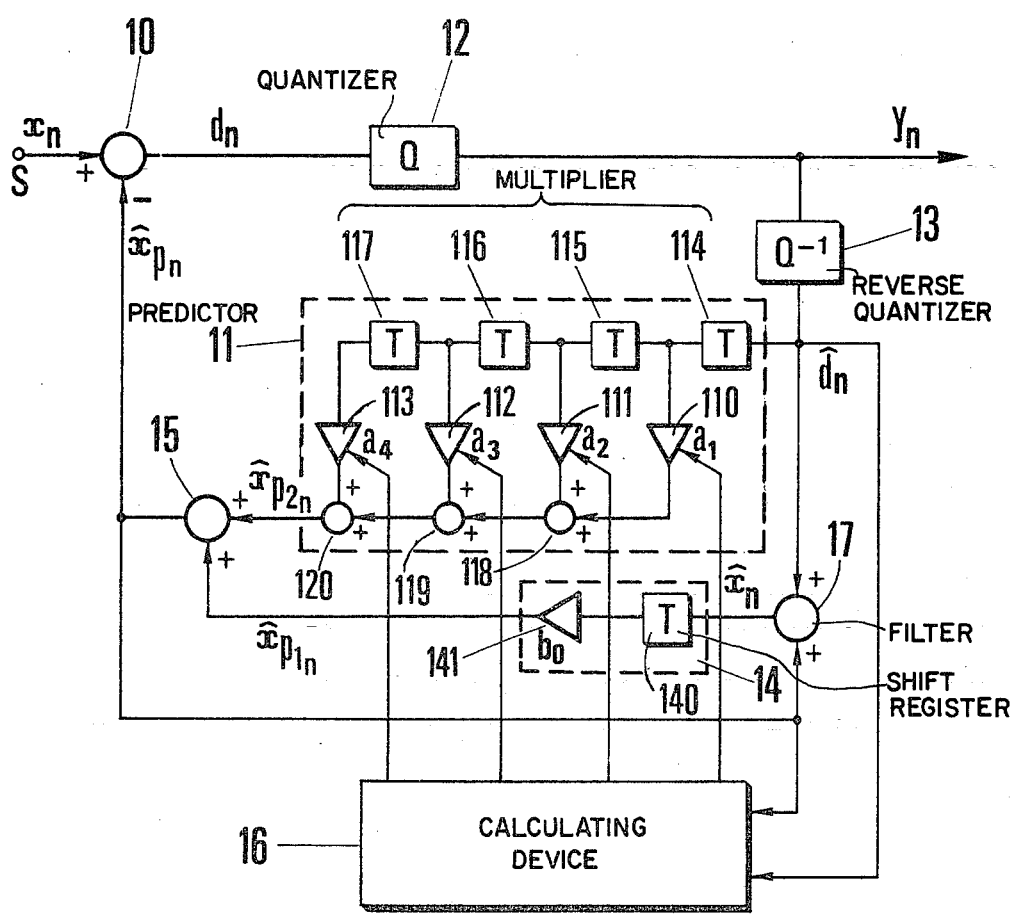

The transmission digital processing device of the invention, and particularly its predictor stage, is illustrated in detail in FIG. 6. The subtracter circuit 10 furnishes, from the incoming samples $x_n$ and the predicted samples $x_{pn}$, differences samples $d_n$ representing the difference between the value of the incoming sample $x_n$ and predicted sample $x_{pn}$. This outcoming sample $d_n$ is converted into a low rate signal $y_n$ by means of a quantizer 12 well known in the art. A reverse quantizer 13 mounted on a negative feedback loop receives at its input the signal $y_n$ transmitted in line and furnishes, at the output, a signal $d_n$ identical to the one which would be received at reception in the absence of transmission errors. This signal $d_n$ is applied, on the one hand, to the input of the predictor 11, on the other hand, to the input of the calculating device 16 reactualizing the coefficients $(a_i)_{1 \leq i \leq 4}$ of the predictor 11. This device 16 is well known in the art. It applies the gradient algorithm, the Kalman algorithm or any algorithm known per se. This device 16 furnishes the 4 coefficients $a_1$, $a_2$, $a_3$, $a_4$ in the embodiment of FIG. 6 to the predictor 11 at the input of the four multiplier circuits 110, 111, 112, 113; each of these multiplier circuits 110, 111, 112, 113 receives the signal $d_n$ furnished by the reverse quantizer 13 respectively delayed by a time T, 2T, 3T, and 4T by means of four shift registers 114, 115, 116, 117 respectively. The two signals obtained at the output of the multiplier circuits 110, 111 are applied to the input of an adder circuit 118. The result obtained at the output of this adder circuit 118 is added to the result of the multiplier circuit 112 by means of the adder circuit 119. The result obtained at the output of the adder circuit 119 is applied to the input of the adder circuit 120 by means of which it is added to the result obtained at the output of the multiplier circuit 113. The result obtained at the output of the adder circuit 120 is predicted signal $x_{p2n}$. This prediction is improved according to the invention by inserting a transverse filter 14 constituted by a shift register 140 followed by a multiplier circuit 141. To this end, an adder circuit 17 adds the predicted sample $x_{pn}$, furnished at the input of the adder circuit 10, to the sample $d_n$ obtained at the output of the reverse quantizer 13 to form the reconstructed sample $x_n$. It is this sample $x_n$ which is successively delayed by a time T by means of the shift register 140 then multiplied by a fixed coefficient $b_o$ by means of a multiplier circuit 141. The sample $x_{p1n}$ furnished at the output of the transverse filter 14 is added to the predicted sample $x_{p2n}$ furnished by the predictor 11 by means of the adder circuit 15. At the output of the adder circuit 15, a predicted sample $x_{pn}$ is obtained which is used at the input of the adder circuit 10.

The samples $d_n$ furnished at the output of the adder circuit 10 are converted into a signal $y_n$ with low sample rate by means of the quantizer 12.

In this case, if the quantizing levels are sufficiently fine (the bit number of the words of signal $y_n$ is greater than or equal to 3 bits), and if the quantizer does not clip the signal, the induced quantizing noise is white.

Figure 7:
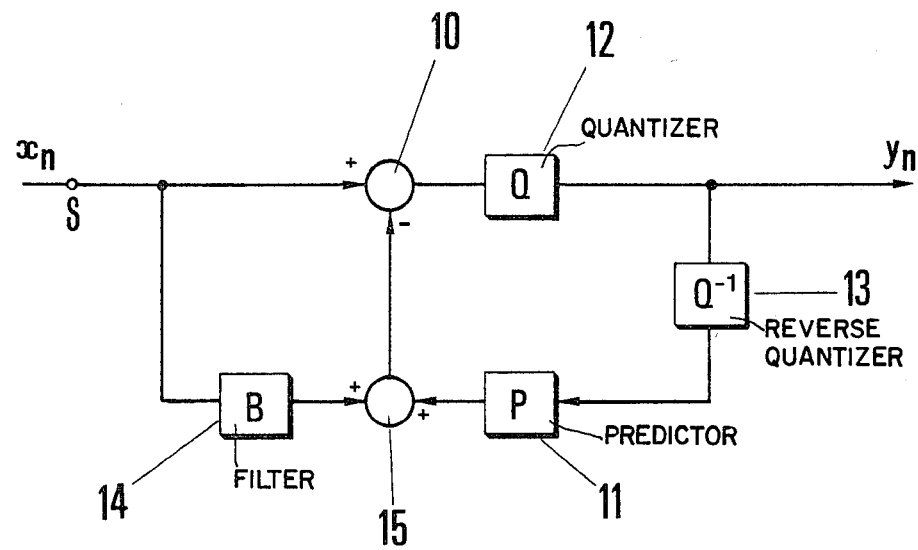
FIG. 7 is a variant embodiment of FIG. 6.

Referring now to FIG. 7, another mode of insertion of the transverse filter 14 is provided according to the invention. The pre-filtering operation is effected directly at the input of the transmission predictor stage, from the incoming samples $x_n$. The filter 14 furnishes samples, at the output, which are added to the predicted samples, derived from the predictor 11, by means of an adder circuit 15. The sample from the circuit 15 is applied to the input of the subtracter circuit 10 to be subtracted from the incoming sample $x_n$. The sample $d_n$ from the subtracter circuit 10 is applied to the input of the quantizer 12. On the negative feedback loop, from the samples $y_n$, the reverse quantizer 13 furnishes reconstructed samples $d_n$ at the input of the predictor 11. The predictor 11 associated with its coefficient reactualization device (not shown) furnishes predicted samples at each instant at the input of the adder circuit 15. Such a mode of insertion of the transverse filter 14 outside the negative feedback loop on which the inverse quantizer is inserted, procures a more coloured transfer function noise reading $1/1 - B_o(z)$ (white noise filtered by the fixed predictor), which may be interesting subjectively in the case of speech processing.

Figure 8:
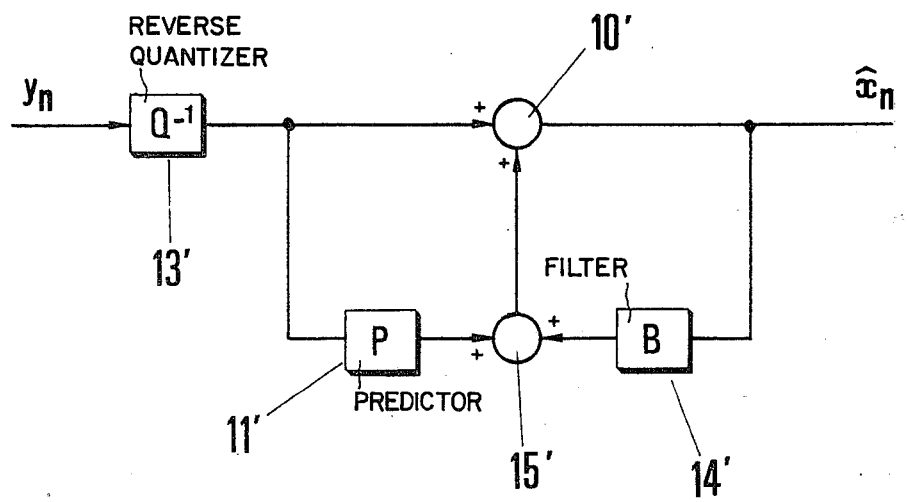
FIG. 8 is a detailed view of the reception device of FIGS. 6 and 7.

FIG. 8 schematically shows the reception device corresponding to the transmission device of FIGS. 6 and 7. The incoming signal $y_n$ is applied to the input of the reverse quantizer 13' which furnishes, at the output, samples at the input of the adder circuit 10' and at the input of the predictor 11'. This predictor 11' associated with its coefficient reactualization device (not shown), furnishes at the input of the adder circuit 15' predicted samples, which are added to the samples furnished by the transverse filter 14'. The prefiltering operation carried out by this filter 14' is effected from the reconstructed sample $x_n$ furnished at the output of the addition circuit 10'. The adder circuit 15' furnishes at the output samples which are added to those derived from the reverse quantizer 13' by means of the adder circuit 10'.

What is claimed is:

1. A predictor stage for a digital processing system for sampled and PCM coded signals, in the form of a sequence of samples $x_n$, comprising first transmission means and first reception means for forming a predicted sample $x_{pn}$, second transmission means for subtracting said sample $x_{pn}$ predicted from said sample $x_n$ coming in at the transmission side, and deriving therefrom a difference sample $d_n$ representing the prediction error, wherein said first transmission means has a recursive structure, each predicted sample $x_{pn}$ being derived from the samples $d_n$, $d_{n-1}$, $d_{n-2}$ ... etc. previously obtained at the output of said second transmission means, and said first reception means has a transverse structure, each sample $x_{pn}$ being derived at the reception side from the difference samples $d_n$, $d_{n-1}$ ... , previously received, said samples $x_{pn}$ predicted at the reception side being added to said difference samples within second reception means.

2. A predictor stage as claimed in claim 1, wherein said first transmission means substantially comprises a predictor with fixed coefficients, optimized for the incoming signals.

3. A predictor stage as claimed in claim 1, wherein said first transmission and reception means substantially comprise an adaptative predictor with coefficients reactualized at each sampling period.

4. A predictor stage as claimed in claim 1, which comprises a quantizer, known per se, for converting the samples $d_n$, $d_{n-1}$, $d_{n-2}$, obtained at the transmission side into a low rate signal.

5. A predictor stage as claimed in claim 1, wherein at the transmission side the samples $x_n$, before being applied to the input of said second transmission means, are added to the samples $x_n$ previously processed by a transverse filter and, at the reception side, the reconstructed samples $\hat{x}_n$ are added to the samples $\hat{x}_n$ previously processed by a similar transverse filter.

6. A predictor stage as claimed in claim 1, wherein a transverse filter is disposed at the transmission side on the negative feedback loop, comprising said first transmission means for forming a predicted sample $x_{pn}$, said transverse filter achieving a prefiltering from the reconstructed sample $\hat{x}_n$ and, at the reception side, the reconstructed samples $\hat{x}_n$ are added to the samples $\hat{x}_n$ previously processed by a similar transverse filter.

* * * * *